United States Patent
Kornfeld et al.

(10) Patent No.: US 8,652,644 B2
(45) Date of Patent: *Feb. 18, 2014

(54) LID FOR CLOSING A CUP

(75) Inventors: Martin Kornfeld, Klosterneuburg (AT);
Lambert Nekula, Hofstetten (AT);
Alfred Wegenberger, Langenlois (AT);
Adolf Schedl, Obergrafendorf (AT);
Franz Reiterer, Getzersdorf (AT)

(73) Assignee: Constantia Teich GmbH (AT)

( * ) Notice: Subject to any disclaimer, the term of this patent is extended or adjusted under 35 U.S.C. 154(b) by 270 days.

This patent is subject to a terminal disclaimer.

(21) Appl. No.: 13/001,606

(22) PCT Filed: Jun. 26, 2009

(86) PCT No.: PCT/AT2009/000257
§ 371 (c)(1),
(2), (4) Date: Mar. 8, 2011

(87) PCT Pub. No.: WO2009/155630
PCT Pub. Date: Dec. 30, 2009

(65) Prior Publication Data
US 2011/0155734 A1    Jun. 30, 2011

(30) Foreign Application Priority Data

Jun. 27, 2008 (EP) .................................... 08450095
Mar. 24, 2009 (EP) .................................... 09450063

(51) Int. Cl.
| B32B 27/32 | (2006.01) |
| B32B 5/16 | (2006.01) |
| B32B 15/04 | (2006.01) |
| B32B 15/08 | (2006.01) |
| B32B 27/08 | (2006.01) |
| B65D 41/32 | (2006.01) |
| B65D 17/34 | (2006.01) |

(52) U.S. Cl.
USPC ........... 428/461; 428/220; 428/323; 428/332; 428/457; 428/515; 220/266; 220/270

(58) Field of Classification Search
None
See application file for complete search history.

(56) References Cited

U.S. PATENT DOCUMENTS

| 4,693,390 A | 9/1987 | Hekal | |
| 6,302,321 B1 * | 10/2001 | Reese et al. | 229/123.1 |
| 6,474,490 B1 * | 11/2002 | Seibel et al. | 215/232 |

FOREIGN PATENT DOCUMENTS

| AT | 9750 B | 11/1902 |
| AT | 501789 A1 | 11/2006 |
| DE | 2240234 A1 | 3/1973 |
| DE | 2901581 A1 | 2/1980 |
| EP | 0 223 253 A2 | 5/1987 |
| EP | 0 262 652 A1 | 4/1988 |
| EP | 0 334 700 A1 | 9/1989 |
| EP | 0 812 782 A1 | 12/1997 |
| EP | 1 110 718 A1 | 6/2001 |
| EP | 1 278 630 A1 | 1/2003 |
| EP | 1 935 805 A1 | 6/2008 |
| EP | 2 040 915 A1 | 4/2009 |
| EP | 1 954 582 B1 | 9/2009 |
| FR | 2503036 A1 | 10/1982 |
| JP | 01283139 A | 11/1989 |
| JP | 2004115117 A | 4/2004 |
| WO | 2007/065055 A1 | 6/2007 |
| WO | 2007/088426 A1 | 8/2007 |
| WO | 2008/006123 A1 | 1/2008 |
| WO | 2009/155630 A3 | 12/2009 |

* cited by examiner

Primary Examiner — Sheeba Ahmed
(74) Attorney, Agent, or Firm — Kolisch Hartwell, P.C.

(57) ABSTRACT

A lid (2) for closing a cup (1) along a peripheral sealing edge (10) and a method for producing such a lid. The lid includes at least one aluminum film and an optionally multi-layered plastic layer which is co-extruded onto the aluminum film and has a closed predetermined tearing line (3). The plastic layer is made of plastic based on polyethylene (PE) or plastic based on polypropylene (PP), and the predetermined tearing line is introduced into the plastic layer preferably by means of a $CO_2$ laser. The predetermined tearing line (3) may be provided directly in the region of the sealing edge (10).

15 Claims, 3 Drawing Sheets

LID FOR CLOSING A CUP

BACKGROUND OF THE INVENTION

1. Field of the Invention

The invention relates to a lid for closing a cup along a circumferential sealing rim, where the lid comprises at least one aluminum foil and an optionally multilayer polymer film coextruded on to the aluminum foil and a cohesive line of weakness is provided in the polymer film, corresponding to the preamble of claim 1.

2. Description of Related Art

Such a lid is known, for example, from WO 2008/006123 A, corresponding to AT 009 750 U and EP 2 040 915 A, published in 2008. This document concentrates on the structure of the material layers forming the contact surface on the two sides of the contact surface.

It is known from WO 2007/065055 A, corresponding to EP 1 954 582 A and U.S. Pat. No. 4,693,390, published in 2007, that the two layers can be adhesively bonded to one another; the line of weakness is introduced by means of a laser beam which is not described in more detail.

EP 0 812 782 A, published in 1997, likewise discloses such a lid. Here, the polymer film comprises at least two layers, with the innermost layer having incisions or lines of weakness near the rim which bound oval regions. After sealing onto a filled cup, peeling off the lid results, due to the predetermined adhesion conditions between the individual layers and the strength of the seal at the rim of the cup, in the inner layer of the plastic film remaining firmly sealed to the container rim, the outer layer of the plastic film and the aluminum foil being peeled off and the oval region which is defined by the lines of weakness of the innermost film remaining adhering to the outer layer on peeling off and thus providing an opening suitable for a drinking straw or drinking from the cup.

The creation of the adhesion between the individual films/layers and the lines of weakness is achieved by means of melting processes which are brought about by means of appropriately heated and profiled rollers while the film runs through them. Although this application originating in the year 1996 comes from one of the largest lid manufacturers in Europe, the subject matter of the patent application never came on to the market; it was not possible to produce it in a commercially justifiable time and at commercially justifiable cost.

EP 1 278 630 B discloses a similar lid which is said to be resealable after opening. For this purpose, a pressure-sensitive adhesive is provided in particular regions of the lids. Apart from the resealability, there are various similarities with the first-named document when the lid is made more mechanically stable in the interests of resealability. For opening only once, this lid is too complicated, and in addition it has been found, in this design, that the separation between the layers is unreliable and the inner layer does not reliably remain in the region of the opening.

AT 501 789 B by the applicant is of an earlier date and has the same objectives as the first-named document and likewise attempts to create the lines of weakness by means of a heatable tool in a thermomechanical way. Here too, reliable and commercially justifiable production is not successful.

A document from far back in 1979, viz. DE 29 01 581 A, attempted to provide a solution to peeling off a layer of a multilayer lid on specific cups having a rolled rim so as to form an opening in the remaining lid material, but this product never came on to the market either.

A similarly old document, viz. FR 2 503 036 A, proposes a very similar solution, namely coextrusion of an aluminum foil and a polymer film, the latter being separated from the composite by lines of weakness in the prescribed regions and being taken off by the aluminum when the lid is peeled off in these places, so that a lid having an opening remains at the rim of the cup even after opening.

Even considerably later (1987), the application of the last-named French document protected an improvement in the USA, but none of the products came on to the market despite the large patenting efforts.

A document concerning somewhat different objectives which goes back to 1971 is DE 22 40 234 A, which seals a two-layer covering film to the container rim in dish-shaped packaging for fresh meat, with the outer layer being impermeable to oxygen and the inner layer being permeable to oxygen. As a result of a weakening of the inner layer in the region of a peeling tab, it is possible to peel off the outer layer alone and thus allow the ageing process for the meat to commence. This packaging was not able to become established, if it appeared on the market at all.

A recent, once again generic, document is WO 2007/088426 A, which contains a series of variants of the documents discussed above (in particular the first-named document). It is notable here that the treatises are extremely cursory so that they actually put forward only ideas but not actually functional solutions. This can be seen in a comparison of FIG. 4 with the associated description, since FIG. 4 is supposed to represent the case in which the outer side of the lid has the lines of weakness, but this means that the hatched part having the reference numeral 24 cannot assume the position shown on being peeled off, because it is the outermost layer which is separated off.

It is stated elsewhere in the text that the lines of weakness can also be provided on the innermost layer or, when more than two films/layers are present, also at the intermediate layers. How this is supposed to function either in production or on opening is not indicated in more detail.

For the production of the lines of weakness, too, mention is merely made of all conceivable possibilities without even one of these being described in detail. It is merely said quite succinctly that a stamping tool or the like or a laser beam can be used. This document is, as mentioned above, of relatively recent date (priority Feb. 2, 2006) and no product corresponding to the content of this document has yet appeared on the market; it would hardly be possible to manufacture such a product on an industrial scale on the basis of the information given in the patent application.

Conventional lids which are sealed to a cup along a circumferential sealing rim for full-area opening suffer from problems that the sealing strengths actually achieved are time and time again too great for normal opening and tearing of the lid, spillage of the contents of the cup because of the great amount of force which has to be applied and similar unpleasant effects therefore occur. The reason is that the packaging companies at which sealing is carried out pay attention mainly to the seal being impermeable and, in the event of problems which are sometimes attributable to a dirty tool, poorly aligned lid feed, etc., tend simply to alter the parameters for the sealing strength (temperature, pressure, time) on the sealing machine so that the desired impermeability of the seal is obtained in each case. However, this virtually inevitably leads to the abovementioned overstrong bonding regions being created at individual places along the sealing seam, which present the user with the abovementioned unacceptable problems. It is an object of an embodiment of the invention to solve this problem.

BRIEF SUMMARY OF THE INVENTION

The applicant has been intensively concerned with the abovementioned problems and the attempted solutions in the documents mentioned and has now found a practicable solution by means of which the desired objectives are achieved and the disadvantages indicated are avoided.

This is achieved according to the invention by the, optionally multilayer, polymer film comprising either polymer based on polyethylene (PE) or polymer based on polypropylene (PP) and by the lines of weakness preferably being introduced into the polymer film by means of a $CO_2$ laser.

This gives a weakening of the polymer film which is restricted to very small areas or a very small volume and whose properties, according to present-day knowledge, can be attributed to the as good as exclusively thermal stressing of the polymer material, as a result of which the regions bounded by the line of weakness reliably remain adhering to the aluminum foil on peeling off and a cleanly delineated removal opening or drinking opening is formed by the polymer film which remains sealed on to the rim of the cup.

The small dimensions of the weakened regions and the weakening by means of heat alone without pressure or shear stress, thus at least essentially without mechanical material deformation, also lead to the material present in the cup not coming into contact with the aluminum layer despite the lines of weakness. This is particularly important in the case of foods having an appreciable proportion of fruit acids since these could lead to local discoloration of the aluminum, which is undesirable for reasons of appearance.

BRIEF DESCRIPTION OF THE SEVERAL VIEWS OF THE DRAWINGS

The invention will be illustrated below with the aid of the drawing. Here.

DETAILED DESCRIPTION OF THE INVENTION

Figure 1:
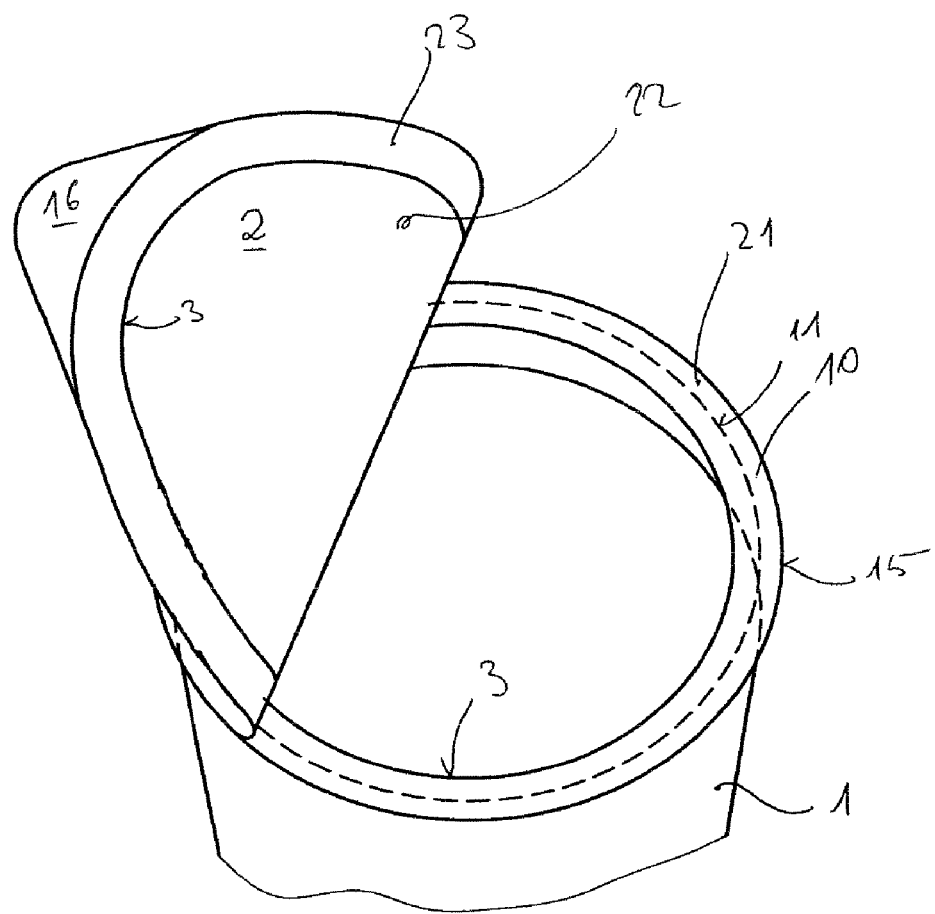
FIG. 1 shows the upper rim region of a partly opened cup.

The individual constituents of the lid and the operations during laser treatment are described in detail below.

The aluminum foil can comprise the aluminum alloys usual for lids or aluminum having the usual degree of purity. The surface can be shiny or matte, and the thickness can be, for example, 50 µm, although wide variations are possible here. Preference is given to using a "soft" aluminum foil; to a person skilled in the field of lid manufacture, this is a familiar term and therefore does not need to be discussed in more detail here.

On the outside of the aluminum foil, i.e. the side facing away from the coextruded polymer film, there is usually some printing which is not affected by the configuration according to the invention of the lid and in turn does not affect the invention and can therefore be applied in all ways known in the prior art, usually on a layer of printing primer, and can, for example, be UV flexographic printing. Use of an embossed aluminum foil is also possible.

A layer of heat sealing varnish, usually PVC-free and preferably colorless, can be applied to the side facing the coextruded polymer film in order to bring the thickness of the bond between the aluminum foil and the polymer film to the desired dimension. Usual values for the amounts used are in the region of about 6 g/m$^2$. This heat sealing varnish layer is not absolutely necessary; a few simple experiments will allow a person skilled in the art to determine whether and in what amount it is required or advantageous in the particular application.

The structure described above is the same for both PE-based and PP-based, coextruded, optionally multilayer, films. Various percentages are indicated below; these are always percentages by weight unless other specific bases are specifically indicated.

When a PE-based coextrudate is used, it can be filled, for example with talc (e.g. CC7209 from Borealis), chalk, $TiO_2$ or other fillers known from the prior art; it is also possible to use dies which are matched, in particular, to the color of the later filled material. Filler contents of up to 40% and more are possible. As talc, it is possible to use, for example, Finntalc M05 SL. There are also "prefilled" systems, for example Maxithen HP 790101 from Gabriel Chemie, or Carolen 252550 from Carova Compounding, which can be fed directly into the extruder.

It is of course also possible to use unfilled PE grades when their rheological properties are suitable for processing on the coating apparatus available, in particular a slit die. This can be determined without problems by a person skilled in the field of extrusion technology on the basis of a knowledge of the invention. Suitable MFI values (melt index, for example in accordance with DIN; 190° C., load of 2.16 kg) are in the range from 2 to 10 g/10 min.

Examples of useable products which are available on the market are:

Escorene LD 252 from Exxon;
PG 7004 from Dow: WA 107672/01/014: 50 g;
PG 7008 from Dow;
CA 8200 from Borealis; and
Bralen NA 7-25 from Sovnaft Petrochemicals.

These PE grades (normally LDPE) (LD=low density) can be used in pure form or as a mixture. To increase the stiffness, HDPE (HD=high density) having a similar flow behavior can be added; when tougher mixtures are required, rubber-like types, known as thermoplastic elastomers (EPDM, etc.) can also be added. The addition of polybutylene (for instance 8340 M or DP 9217 from Basell or ethylene copolymers such as EAA (ethylene-acrylic acid copolymer), EMA (ethylene-methacrylate copolymer), or ionomers (based on ethylene-acrylic acid, individual acid groups replaced by ions) in an amount of up to 30% is also possible.

When a PP-based coextrudate is used, it can likewise be filled or unfilled.

Unfilled grades preferably have an MFI of from 8 to 22 g/10 min (melt index, for example in accordance with DIN; 230° C., load of 2.16 kg). Possibilities are PP homopolymers, PP copolymers, branched PP grades (known as HMS-PP grades), metallocene, heterophase PP grades, and also mixtures in this viscosity range and blends. To improve the properties, a proportion of PE can be added (e.g. WG 341 C from Borealis, which contains about 30% of PE, or else another polyolefin-based material, e.g. polybutylene). The suitability for processing to produce flat structures in extrusion plants can in the case of doubt easily be determined by a person skilled in the field of plastics extrusion, if appropriate by means of a few experiments on the laboratory scale. Any proportion of PE, as mentioned above, can also be significantly higher than the 30% mentioned in the case of lids which are not sterilized.

Examples of useable products which are obtainable on the market are:

WG 341C from Borealis;
Daploy WD 234 HMS from Borealis;
Hifax DKS 208 nat. from Basell; and
Domolen 1011S from Domo.

Example of a mixture:

56% WG341C with 30% WD 234 HMS and 14% HG 420 FB (from Borealis).

Filled grades are commercially available, e.g. WG 350C from Borealis, but can of course also be mixed by the user; a mixture of 80% of WG341 C with 20% of VATPOL 265F65 (with 60% of filler) from SILON has been found to be useful.

As colorants, it is possible to use all conventional colorant masterbatches, e.g. for coffee brown HP 820761 or PP 821361 from Gabriel Chemie, and for white the usual $TiO_2$.

Multilayer structures of the coextrusion layer are possible for both PE-based and PP-based polymers and are in many cases advantageous. Here, in the case of a symmetrical structure, the outer layers can be selected so that they have the best possible properties for discharge of the coextrudate at the slit die and that the inner layer(s) has/have the desired mechanical and/or thermal properties.

Both in this case and especially in the case of an unsymmetrical structure, the outer layer facing away from the aluminum foil (later located on the container side) can also take account of the nature of the material of the cup/container on to the rim of which the lid is sealed. In this case, this may be a layer of Appeel 20D745 from DuPont, optionally with from 2 to 5% of lubricant additive such as Conpol 20S2 from DuPont, in order to seal both against PS cups and against PP cups.

In the case of a symmetrical structure (in which the weights per unit area of corresponding layers can, however, be different), for example: PG7004 (unfilled PE)//CC7209 (filled PE)//PG7004, the stiffness and elasticity of the total film can be influenced in a targeted way. Another combination which has been found to be useful in experiments is: PG7004// Appeel 20D745 (unfilled EMA) or Appeel 20D855 (EMA with filler), both from DuPont//PG7004. Instead of EMA, it is also possible to use other ionomers, e.g. Surlyn 1652-E.

Further compositions which can be used in practice are: Based on PE: three-layer system, 70 µm: PG7004 14 g//CC7209 49 g//PG7004 7 g.
Based on PP: Hifax DKS 208 nat 16 g//WG350C 28 g//Hifax DKS208 nat 6 g; here, 22 g//40 g//8 g also give good results.

A particularly suitable combination of constituents for the lid according to the invention has, in the sealed-on state from the outside inward, an aluminum layer, a layer of "bonding agent" and then at least one layer referred to hereinafter as "functional layer". As can be seen from this cursory listing, all layers customary for printing and also others are not mentioned; only the layers which are located on both sides of the contact surface at which separation occurs, and therefore also referred to as separation plane, are listed in the presentation of this combination.

The difficulties of proper separation of the layers which can be seen from the prior art cited at the outset can, according to this aspect of the invention, be eliminated by providing a layer of a "bonding agent" which forms a particularly intimate bond with the aluminum and thus forms a layer which adheres strongly thereto on the side facing the separation plane. The adjoining functional layer and optionally a further layer known as the second layer is selected so that it seals as strongly as possible against the cup or container in question, which usually comprises a PP material. It follows therefrom that the adhesion between the "bonding agent" and the functional layer which is in contact therewith has to be less than the adhesion between aluminum and "bonding agent" and also the adhesion between functional layer and cup in the region of the seal. When at least one second layer is provided in addition to the functional layer, this condition also applies to the adhesion in any of the contact surfaces formed between these.

According to the invention, these conditions are satisfied when using a "bonding agent" based on ethylene-acrylic acid copolymers, EAA for short, in an excellent way. Here, not only the excellent adhesion of EAA in all its concentration ranges to aluminum in the form of all alloys and embodiments customary for lids (with the adhesion increasing with increasing proportion of acrylic acid) but also the fact that EAA builds up good adhesion to polyethylene and that this adhesion can be increased by increasing the proportion of ethylene in the EAA and, conversely, can be reduced by increasing the proportion of acrylic acid are particularly advantageous. This makes it possible, given a knowledge of the material of the cup and the quality of the closure to be produced and also of the aluminum used and the other boundary conditions, to establish, by means of a few experiments, the composition of the EAA at which the desired adhesion and separation properties are achieved for the lid.

A further particular property of EAA which may be noted is that it has poor adhesion to polypropylene, so that it is possible to influence further the desired adhesion values by means of an appropriate composition of the functional layer which comes into contact with the EAA. When more than 50% of polypropylene polymers (homopolymer, copolymer and/or TPO=thermoplastic olefin) is present and a particular proportion of polyethylene which can be established by means of a few experiments, preferably below 25%, is present, the necessary minimum adhesion at the separation plane can be achieved using an EEA containing about 9% of acrylic acid without the adhesion being so strong that peeling-off would be problematical.

At a higher proportion of acrylic acid, for example 12% and above, it is also possible to use a functional layer having a PE content of 40% and above without destroying the desired peeling effect; this system composed of "bonding agent" and functional layer can be employed usefully within a wide range by matching to the known boundary conditions in each case by a person skilled in the art.

In addition, it should also be stated that, as in the two abovementioned examples, various fillers such as talc, titanium oxide, chalk and colored pigments which do not appreciably change the adhesion behavior of the layer itself can be used in the functional layer. In particular cases, the PE can be at least partly replaced by ethylene copolymers such as EMA (ethylene-methyl acrylate); the layer can also consist entirely of polypropylene or an 80:20 mixture of PP:EMA.

A further advantage of the use of such a functional layer comprising essentially PE and PP is that the proportion of PE has a favorable effect on the processing behavior of the mixture.

A second layer can adjoin the abovementioned functional layer, particularly when this is desirable in order to achieve specific effects on sealing or when, for any reason, the material with which the lid comes into contact makes it appear to be advisable. A further reason can be the production of the lid sheet by coextrusion, since the functional layer mentioned tends to form a "die beard", which again and again leads to extrusion malfunctions. The formation of such a die beard involves formation of deposits, in particular of filler, on the lip of the extrusion die; these deposits disrupt the formation of a defect-free surface and become detached after reaching a particular size, which leads to damage to the lid sheet. On the other hand, when a second layer, for example comprising 30% of LDPE and 70% of PP, is coextruded as outermost layer with the functional layer, the sealability against a PP container is improved further and, secondly, the formation of the die beard is reliably avoided. Since, in addition, excellent adhesion conditions prevail between the functional layer and the second layer, such an embodiment is preferred.

In various tests, excellent results were achieved using the materials mentioned when the "bonding agent" was applied in an amount of from 7 to 8 g/m², the functional layer was applied in an amount of about 12 g/m² and the second layer was applied in an amount of about 5 g/m². The results make it clear that, in particular, the amount of the "bonding agent" can still be reduced.

Merely as obiter dictum, it should be pointed out that both the functional layer and the second layer can contain fillers, in particular talc, in the amounts customary in the production of lids. Three examples of the composition of the functional layer will make this clear.

| Constituent | Example 1 (% by weight) | Example 2 (% by weight) | Example 3 (% by weight) |
|---|---|---|---|
| LDPE | 20 | 24 | 15 |
| PP homopolymer* | 30 | 56 | 40 |
| PP random copolymer | 40 | 0 | 0 |
| TPO = thermoplastic polyolefin | 0 | 0 | 35 |
| Talc | 10 | 20 | 10 |

*Mixture of various PP grades having different viscosities

As laser source, it is possible to use, for example, a StarScribe CW from Carl Baasel Lasertechnik, Starnberg, Germany. This $CO_2$ laser is particularly suitable for scoring film laminates and has a wavelength of 10.6 μm at a power of 300 W, in the case of some models also 360 W and in special cases up to 450 W, in the case of some models also wavelengths of 10.25 μm. The lid material present in the form of a continuous sheet (usually in a width of two lids offset next to one another) is, with the polymer layer facing the laser and sliding on a suitable support coming from a stock roll, moved past the laser and after processing is wound up on a drum. The laser beam is appropriately moved over the surface by means of two or three axially moveable mirrors; the laser source is usually stationary.

The focusing (or the theoretical center thereof) of the beam is preferably on to a point above, preferably just above, the aluminum foil so that the greatest intensity of energy input is deep in the interior of the usually multilayer polymer film (if the term "deep" is appropriate at all at the thicknesses indicated). As a guide, it can be said that focusing, seen from the side of the incidence of the laser, should be at a point which is located at a depth between 75% and 90%, preferably between 80% and 85%, of the thickness of the layer to be treated with the laser. The layer to be treated with the laser is the layer between the outermost surface of the lid and the surface of the aluminum foil facing the laser. The focusing itself reaches diameters of from 150 μm to 350 μm, with preference being given to regions in the range from 170 μm to 210 μm. In this way, the weakening of the material during movement of the laser is concentrated on only a very narrow region, and excess energy is quickly removed without causing damage by the highly thermally conductive, nearby aluminum foil.

As a simple but reliable rule of thumb, it can be said that the weakening of the polymer film is sufficient but not too great when a linear region having a slightly increased (compared to the surrounding area) reflection can be discerned by the naked eye on the surface of the aluminum foil on close examination after removal of the polymer film. A conspicuous line indicates excessive energy input, while a change which cannot be discerned or can be barely discerned even with increased attention points to insufficient energy input. This classification is not actually quantifiable, but the optical change resists a more objective definition.

The speed of the point of incidence of the laser beam on the surface of the lid material is from a few mm/s to some cm/s, preferably from 5 mm/s to 5 cm/s, depending on the nature and the thickness of the layers to be weakened and the desired degree of weakening.

The cut obtained in the mode of operation described is so narrow that the material cannot, even if it is present in liquid form, penetrate through to the aluminum. The relocation process of the molten but at least softened polymer of the disrupted region, which has the shape of an extremely narrow notch, which occurs up to cooling is also refilled at least at the bottom without this leading to restoration of the mechanical strength of the weakened layer.

To keep the foil flat during the movement over the support, the support can be provided with openings which are connected to a suction device and thus suck the foil against the defined surface of the support as a result of the pressure difference. The correct degree of subatmospheric pressure can be determined by a person skilled in the art by means of a few experiments as a function of the foil speed, the foil strength and the quality of the line of weakening obtained.

This combination of materials and the treatment thereof achieves the abovementioned objective even on an industrial scale with sufficient accuracy, reliability and at commercially acceptable cost.

It is assumed that other types of laser are also able to produce appropriate lines of weakening, although the $CO_2$ laser has produced the best results in experiments carried out by the applicant. Progress in the field of laser technology has recently also made the use of $CO_2$ lasers having a power of 100 W with virtually unchanged operating parameters possible; a person skilled in the field of lid production and having knowledge of the invention and the desired lid can use such lasers appropriately after a few experiments.

At least one cohesively closed line of weakness which defines the future drinking opening is in this way applied to each individual lid. In addition, a further, then preferably smaller, opening which serves either for admission of air during drinking or for pushing in a drinking straw can be defined by a further line of weakness.

An embodiment which has been found to be useful in practice concerns the formation of the line of weakness in the region of the opening tab in the form of a serpentine line which "winds" around the future sealing seam. This ensures that both the opening of the packaging and also separation of the polymer film from the aluminum foil occur reliably and cleanly. Without this measure, it is possible, particularly in the case of PP-based polymer films for separation of the two layers not to occur or to occur only very unsatisfactorily.

The production of the line of weakness by means of a laser is readily discernible on the finished lid since the abovementioned optical change on the aluminum layer is formed only when the line of weakness is produced by means of a laser. Both purely mechanical and mechanothermal production of the line of weakness result in a completely different form of the line of weakness; in particular this is significantly broader and exposes noticeable regions of the surface of the aluminum foil.

A new field of application for such lids having foils having specifically configured openings remaining on the container rim after peeling-off is medicine bottles in which, despite the name, not liquids but solid pills, tablets, coated tablets, capsules, etc., which usually have no further packaging are present in large numbers. As a result of the configuration according to the invention of the opening in the foil, the large opening can, before sealing by the packager, be used for convenient and rapid filling and the user is provided with an appropriately small opening which aids individual rolling-out of the pellet-like contents.

Instead of medicines, this can also be used for confectionery, chewing gum in appropriate form, lozenges, pastilles, etc.

The invention is not restricted to the examples described but can be modified in a variety of ways. Thus, it is possible to use, in particular, polymers or polymer mixtures different from those indicated, even when the fundamentals, viz. the PE- or PP-based polymer films, remain.

In the abovementioned embodiment of the invention, these objectives, viz. avoidance of the problem of excessively strong sealing, are achieved by, in a lid of the type mentioned at the outset, the cohesively closed line of weakness being arranged as close as possible to the sealing rim on its inside, sometimes also in the interior region of the sealing rim, regardless of the way in which the line of weakness is produced, even though it is preferably produced by a laser here.

In this way, the seal is not peeled off on pulling off the lid, but instead the composite of the aluminum foil and the polymer film in this region, with the polymer film remaining on the lid over virtually the entire opening of the cup and thus making free the entire opening.

In a preferred embodiment, the line of weakness is located in a region relative to the sealing rim which on its interior contour is delimited by a line which has a spacing from the inner edge of the sealing rim corresponding to the width of the sealing rim and whose outer contour runs within the sealing rim, with the spacing from the inner edge of the sealing rim being not more than one third, preferably not more than one quarter, of the width of the sealing rim. These measures ensure, even in the case of relatively large tolerances in respect of the position of the sealing rim, that, firstly, the line of weakness coincides very precisely with the inner rim of the cup or the cup opening and, secondly, the line of weakness is not so deep in the sealing rim that peeling off of the aluminum foil from the polymer film occurs from there, which would leave the polymer film on the rim of the cup.

FIG. 1 shows a perspective, schematic view of the upper region of a cup 1 which is/was closed by a lid 2 according to the invention which is partly peeled off. At the sealing rim 10 of the cup 1, an annular part 21 of the lid 2, comprising the laminated-on polymer film, has remained; separation occurs along the line of weakness 3. The broken line 11 indicates the inner contour of the sealing rim in order to show the closeness of this inner contour 11 of the sealing rim to the line of weakness 3.

The peeled-off part of the lid 2 has the aluminum layer and the laminated-on polymer film in its central region 22, and only the aluminum layer in its rim region 23 since the polymer film remains on the sealing rim 10 in this region.

Figure 2:
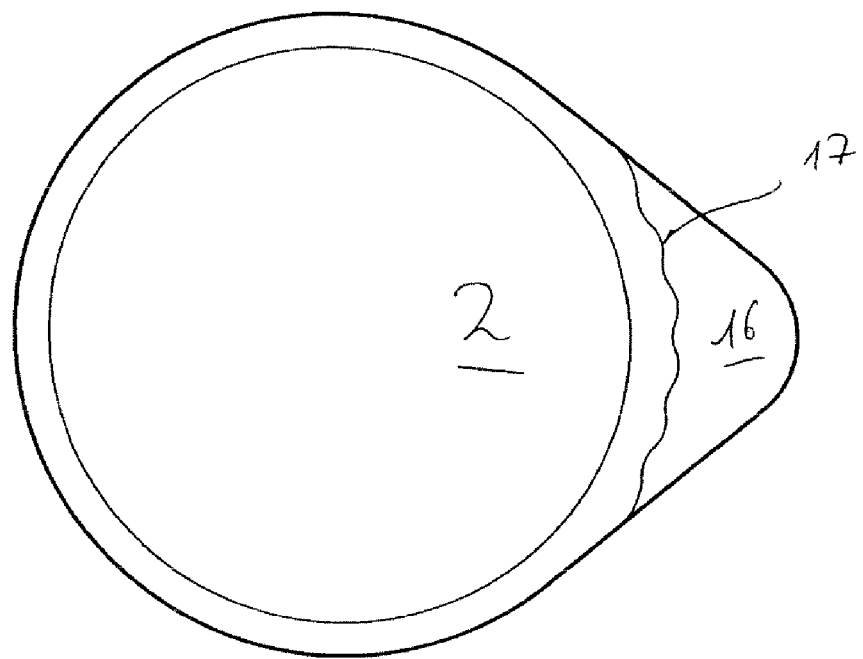
FIG. 2 shows a bottom view of a lid and
FIG. 3 shows a detail.

It can be seen from FIG. 2 that in the region of the tab 16 it is possible to provide an outer line of weakness 17, optionally having a wavy shape, in order to aid separation of the annular part 21 remaining on the sealing rim without leading to damage to the aluminum foil.

Figure 3:
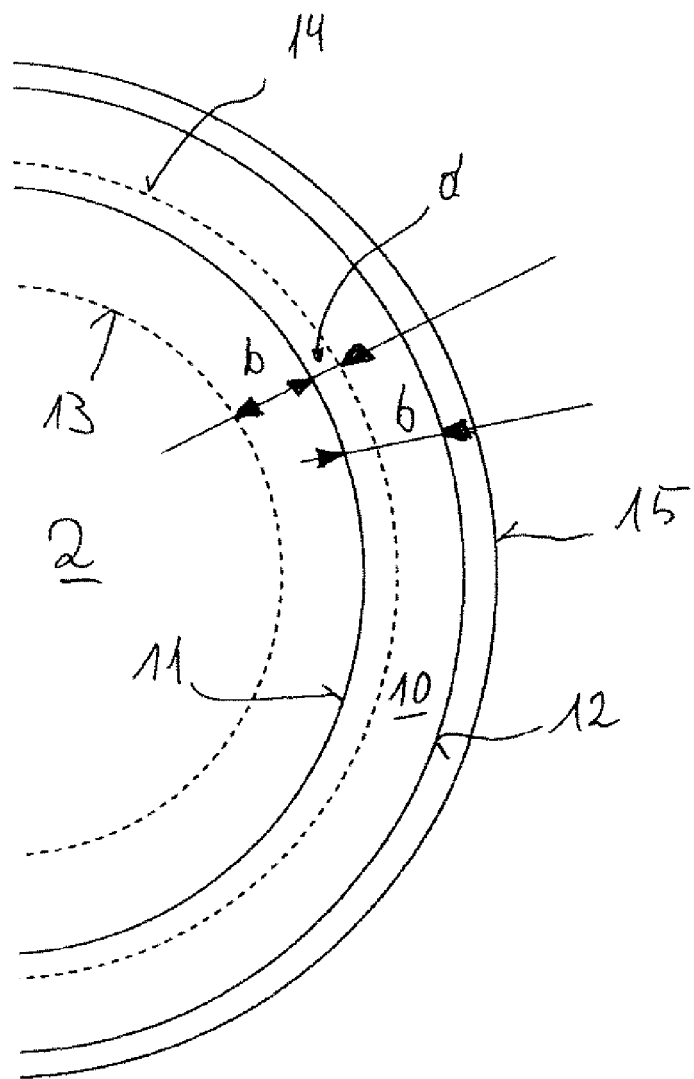

Finally, FIG. 3 depicts a sealing rim 10, purely schematically with its inner edge 11 and its outer edge 12 and its surroundings. It should be pointed out again that the precise position of the sealing rim 10 both on the rim of the cup and on the lid is determined only on sealing of the cup by the setting of the sealing machine and the tolerances which occur when laying the lid on the rim of the cup; the figure thus starts out, for illustrative purposes, from a previously sealed lid.

With this proviso, the line of weakness (not shown) should be in a region relative to the sealing rim or to the sealing seam indicated by two lines 13, 14: the inner delimiting line 13 is at a distance of not more than 2b, preferably not more than b, from the inner contour 11 of the sealing rim, with b being the width of the sealing rim. The outer delimiting line 14 is in turn at a distance d from the inner contour 11 of the sealing rim 10 which does not exceed a maximum of one third, but preferably a maximum of one quarter, of the width b of the sealing rim 10: $d \leq b/3$ or preferably: $d \leq b/4$.

A person skilled in the field of lid production and knowing the tolerances of the apparatuses used can then easily determine the best possible position of the line of weakness on the lid 2, whose outer rim is denoted by 15 and from which the constructor has proceeded. The position of the outer rim of the cup 1 is, for reasons of clarity, not shown in any of the figures.

To be able to check fulfillment of the characteristics according to the invention even in the case of lids which have not yet been sealed, it should be stated that the line of weakness encloses at least 70%, preferably at least 75% or better 85%, of the surface area of the lid, without taking into account any tab present; the greater the area of the lid, the larger the enclosed proportion. This corresponds in the case of a circular lid having an external diameter of 75 mm (and disregarding the tab) to a diameter of the likewise circular line of weakness of (about) 68 mm or of (about) 70 mm, disregarding any serpentine lines or other configurations.

At an external diameter of 95 mm of the lid, the invention provides for a diameter of the line of weakness of from 81 to 85 mm, depending on the configuration of the sealing rim, which corresponds to an enclosed proportion of the area of from 72% to 80%.

What is claimed is:

1. A lid for closing a cup along a circumferential sealing rim, the lid comprising:
   an aluminum foil; and
   a functional layer coextruded onto the aluminum foil; wherein the functional layer comprises one or more layers of a polymer film that is based upon polyethylene (PE), polypropylene (PP), or a mixture thereof; the polymer film including a cohesive line of weakness introduced by means of a $CO_2$ laser;
   wherein the aluminum foil is adjoined to the polymer film by a bonding agent that includes ethylene-acrylic acid copolymers.

2. The lid as claimed in claim 1, wherein the functional layer includes at least 50% polypropylene polymers by weight.

3. The lid as claimed in claim 1, wherein the functional layer contains not more than 25% polyethylene polymers by weight.

4. The lid as claimed in claim 1, wherein the functional layer further comprises an additional polymer film layer containing polyethylene and polypropylene polymers and having a higher proportion of polypropylene than the first polymer film layer.

5. The lid as claimed in claim 1, wherein the cohesive line of weakness is provided in a region adjacent to the circumferential sealing rim, the region being bounded by an inner line that is disposed not more than twice the width of the sealing rim from an inner contour of the sealing rim in an inward direction, and an outer line that is disposed a maximum of one-third of the width of the sealing rim outside an inner contour of the sealing rim.

6. The lid as claimed in claim 5, wherein the spacing of the inner line from the inner contour is smaller than the width of the circumferential sealing rim.

7. The lid as claimed in claim 5, wherein the spacing of the outer line from the inner contour of the sealing rim is smaller than one-quarter of the width of the sealing rim.

8. The lid as claimed in claim 5, further comprising a tab for opening the lid, wherein the cohesive line of weakness has a serpentine shape in a region near the tab.

9. The lid as claimed in claim 1, further comprising a layer of hot sealing varnish disposed between the aluminum foil and the coextruded functional layer.

10. The lid as claimed in claim 9, wherein the hot sealing varnish is PVC-free.

11. The lid as claimed in claim 9, wherein the hot sealing varnish is colorless.

12. The lid as claimed in claim 1, wherein the functional layer has a thickness of about 70 μm and includes three layers of polymer film based on polyethylene, wherein the layer facing the cup interior includes an unfilled polyethylene polymer formulation in an amount of 14 $g/m^2$, the middle layer includes a polyethylene polymer formulation including talc filler in an amount of 49 $g/m^2$, and the layer facing the aluminum foil includes the unfilled polyethylene polymer formulation in an amount of 7 $g/m^2$.

13. The lid as claimed in claim 1, wherein the functional layer has a thickness of about 70 μm and includes three layers of polymer film based on polypropylene, wherein the layer facing the contents includes an unfilled polypropylene polymer formulation in an amount of 16 $g/m^2$, the middle layer includes a filled polypropylene polymer formulation in an amount of 28 $g/m^2$ and the layer facing the aluminum foil includes the unfilled polypropylene polymer formulation in an amount of 6 $g/m^2$.

14. A sealed cup, wherein the cup has a circumferential sealing rim and a lid forming a seal along the circumferential sealing rim, the lid comprising:
an outer aluminum foil layer; and
a functional layer coextruded onto the aluminum foil layer; wherein the functional layer has a thickness of about 70 μm and includes three layers of polymer film based on polyethylene, wherein the layer facing the cup interior includes an unfilled polyethylene polymer formulation in an amount of 14 $g/m^2$, the middle layer includes a polyethylene polymer formulation including talc filler in an amount of 49 $g/m^2$, and the layer facing the aluminum foil includes the unfilled polyethylene polymer formulation in an amount of 7 $g/m^2$;
wherein the functional layer is joined to the aluminum foil layer by a bonding agent that includes ethylene-acrylic acid copolymers; and
the functional layer includes a cohesive line of weakness in one or more constituent polymer films introduced by means of a $CO_2$ laser, the cohesive line of weakness disposed in a region of the functional layer adjacent to the circumferential sealing rim, the region being bounded by an inner line that is disposed not more than twice the width of the sealing rim from an inner contour of the sealing rim in an inward direction, and an outer line that is disposed a maximum of one-third of the width of the sealing rim outside an inner contour of the sealing rim.

15. A sealed cup, wherein the cup has a circumferential sealing rim and a lid forming a seal along the circumferential sealing rim, the lid comprising:
an outer aluminum foil layer; and
a functional layer coextruded onto the aluminum foil layer; wherein the functional layer has a thickness of about 70 μm and includes three layers of polymer film based on polypropylene, wherein the layer facing the contents includes an unfilled polypropylene polymer formulation in an amount of 16 $g/m^2$, the middle layer includes a filled polypropylene polymer formulation in an amount of 28 $g/m^2$ and the layer facing the aluminum foil includes the unfilled polypropylene polymer formulation in an amount of 6 $g/m^2$;
wherein the functional layer is joined to the aluminum foil layer by a bonding agent that includes ethylene-acrylic acid copolymers; and
the functional layer includes a cohesive line of weakness in one or more constituent polymer films introduced by means of a $CO_2$ laser, the cohesive line of weakness disposed in a region of the functional layer adjacent to the circumferential sealing rim, the region being bounded by an inner line that is disposed not more than twice the width of the sealing rim from an inner contour of the sealing rim in an inward direction, and an outer line that is disposed a maximum of one-third of the width of the sealing rim outside an inner contour of the sealing rim.

\* \* \* \* \*